United States Patent
Terfloth et al.

(10) Patent No.: US 9,242,430 B2
(45) Date of Patent: Jan. 26, 2016

(54) METHOD FOR LAMINATING FLAT SUPPORT MATERIALS ON SUBSTRATES

(75) Inventors: Christian Terfloth, Detmold (DE); Felix Starck, Detmold (DE)

(73) Assignee: JOWAT AG, Detmold (DE)

( * ) Notice: Subject to any disclaimer, the term of this patent is extended or adjusted under 35 U.S.C. 154(b) by 1868 days.

(21) Appl. No.: 11/909,993

(22) PCT Filed: Feb. 20, 2006

(86) PCT No.: PCT/EP2006/001495
§ 371 (c)(1),
(2), (4) Date: Sep. 28, 2007

(87) PCT Pub. No.: WO2006/102957
PCT Pub. Date: Oct. 5, 2006

(65) Prior Publication Data
US 2009/0053463 A1 Feb. 26, 2009

(30) Foreign Application Priority Data

Apr. 1, 2005 (DE) .......................... 10 2005 015 340

(51) Int. Cl.
| | | |
|---|---|---|
| B32B 37/12 | (2006.01) |
| B32B 7/00 | (2006.01) |
| B32B 7/12 | (2006.01) |
| B29C 63/48 | (2006.01) |
| B32B 15/08 | (2006.01) |
| B32B 38/12 | (2006.01) |
| B32B 38/14 | (2006.01) |
| B29C 63/02 | (2006.01) |
| B32B 37/18 | (2006.01) |
| B32B 37/20 | (2006.01) |
| B32B 38/00 | (2006.01) |
| B32B 38/06 | (2006.01) |

(52) U.S. Cl.
CPC .................. *B32B 7/12* (2013.01); *B29C 63/486* (2013.01); *B32B 15/08* (2013.01); *B32B 37/12* (2013.01); *B32B 38/12* (2013.01); *B32B 38/14* (2013.01); *B29C 63/02* (2013.01); *B29C 2063/485* (2013.01); *B32B 37/1284* (2013.01); *B32B 37/182* (2013.01); *B32B 37/203* (2013.01); *B32B 38/0004* (2013.01); *B32B 38/06* (2013.01); *B32B 38/145* (2013.01); *B32B 2307/5825* (2013.01); *B32B 2317/08* (2013.01); *B32B 2317/12* (2013.01); *B32B 2333/00* (2013.01); *B32B 2367/00* (2013.01); *B32B 2375/00* (2013.01); *B32B 2435/02* (2013.01); *B32B 2439/62* (2013.01); *B32B 2439/66* (2013.01); *Y10T 428/24* (2015.01)

(58) Field of Classification Search
CPC ................................. B32B 37/12; B32B 7/00
USPC .............................................. 156/295; 428/98
See application file for complete search history.

(56) References Cited

U.S. PATENT DOCUMENTS

| | | | | |
|---|---|---|---|---|
| 2,415,644 A | * | 2/1947 | Leonhard | 427/348 |
| 3,442,742 A | * | 5/1969 | Jorgensen | 156/244.16 |
| 4,407,689 A | * | 10/1983 | Ohtsuki et al. | 156/243 |
| 4,499,040 A | * | 2/1985 | Maemoto et al. | 264/167 |
| 5,072,605 A | * | 12/1991 | Imazu et al. | 72/46 |
| 5,700,542 A | | 12/1997 | Pirchl et al. | |
| 5,994,474 A | * | 11/1999 | Wey et al. | 525/288 |
| 2007/0036995 A1 | * | 2/2007 | Suzuki et al. | 428/458 |

FOREIGN PATENT DOCUMENTS

| | | |
|---|---|---|
| DE | 44 20 532 A1 | 1/1996 |
| DE | 692 19 041 T2 | 7/1997 |
| DE | 100 04 593 C1 | 9/2001 |
| DE | 101 30 005 A1 | 1/2003 |
| FR | 2 790 424 A | 9/2000 |
| JP | 63203324 A | 8/1988 |
| WO | WO 97/21542 A | 6/1997 |

OTHER PUBLICATIONS

International Preliminary Report on Patentability (in English) from PCT/EP2006/001495, dated Nov. 8, 2007, 12 pgs.

* cited by examiner

*Primary Examiner* — Daniel Lee
(74) *Attorney, Agent, or Firm* — Edward E. Sowers; Brannon Sowers & Cracraft PC

(57) ABSTRACT

The invention relates to a method for permanently joining an essentially flat support material to a substrate, in particular for laminating a plastic film to a metal substrate, wherein the at least essentially flat support material and/or the substrate is/are initially impinged upon by a connecting agent, preferably, an adhesive and subsequently the support material and the substrate are brought together in such a manner that the support material is permanently connected to the substrate, in particular, the plastic film is laminated on the metal substrate, and optionally, measuring and/or shaping of the thus formed composite material is carried out.

16 Claims, No Drawings

METHOD FOR LAMINATING FLAT SUPPORT MATERIALS ON SUBSTRATES

CROSS-REFERENCES TO RELATED APPLICATIONS

This application is a National Stage filing of International Application PCT/EP2006/001495, filed Feb. 20, 2006, claiming priority to German Application No. 10 2005 015 340.2 filed Apr. 1, 2005, entitled "METHOD FOR LAMINATING FLAT SUPPORT MATERIALS ON SUBSTRATES". The present application claims priority to PCT/EP2006/001495, and to German Application No. 10 2005 015 340.2, and both references are expressly incorporated by reference herein, in their entireties.

BACKGROUND OF THE INVENTION

The present invention relates to a method for permanently joining at least essentially flat support materials on substrates, in particular, for laminating plastic films onto metal substrates, and also to the products or composite materials produced in this way, in particular, metal substrates laminated with plastic film, and also to its use.

Various methods are known for the coating of metal substrates, especially plate-shaped metal substrates, with a printing or coating material visually and/or tactilely changing one or both sides of these substrates.

For example, in the field of producing coated or printed metal plates or metal sheets, coatings and printing inks are used that react to UV or which contain solvents. In particular, producers of, e.g., metal packages or screw plugs for jars and bottles, crown caps, technical cans, food or aerosol cans, and the like, as well as producers of a plurality of other products made from coated and printed metal (e.g., toys, decorations) are increasingly confronted with questions and problems, primarily in the fields of environmentally friendly solvents and food compatibility.

Color and/or printed metal products according to the current state of the art are predominantly produced with extremely high energy and investment-associated expenses and also with high environmental risks:

In a first work step, one side of the metal plate is coated with a base coating for later printing, with solvent coatings being dried thermally by means of technically very complicated, large-volume, and high-investment drying furnaces for metal plates transported in a nearly vertical arrangement. Equally, the so-called protective coating for the other plate side is applied in a second separate, but equally complicated work step. In turn, in a third separate, equally complicated work step, the one-sided printing of the metal plates is then performed, in turn, with subsequent complicated thermal drying. A protective or high-gloss coating on the printing inks is completed in another, separate, fourth work step with comparatively high expense like for the base coating.

In the use of UV-reactive coatings and inks, identical production steps are necessary, with merely the drying of these coatings and printing inks not being performed thermally, but instead by UV irradiation of the metal plates, which is similarly very expensive in terms of energy and requires high investment.

The emission of volatile organic compounds is an increasingly important problem for metal coatings particularly in the processing of solvent-containing coatings and printing inks. In addition, coating and printing methods used today command extremely high costs for investment, space, energy, and operation, as well as for meeting the increasingly production-restrictive legal emission regulations.

Producers of coated and/or printed metal products predominantly process metal plates according to the methods described above in widths or thicknesses of 0.05 to 1.0 mm and in many different dimensions of, in general, at least 200×200 mm—according to the end products to be produced. The end products are produced, for example, by means of stamping blanks from a coated and/or printed metal plate and then shaping these blanks according to the end product.

In addition, various methods for laminating metal surfaces are known from the state of the art.

For example, from DE 100 04 593 C1 a special method for producing blanks for motor vehicle license plates, wherein a fed sheet band with printed film is laminated by expanding the film printed undersized to a controllable laminate distance before and/or during the lamination. The method described there is suitable only for the special problem of producing blanks for motor vehicle license plates, but in general is not suitable for laminating arbitrary support materials on arbitrary substrates and thus is not usable universally.

DE 44 20 532 A1 describes a method for producing a metal can, a device for performing this method, and also the metal can produced according to this method. In the method described in DE 44 20 532 A1, a plastic film blank produced from a special plastic film is laminated onto a completed can body. This is relatively complicated and only slightly flexible in terms of application.

DE 692 19 041 T2 describes a device for laminating can blanks, wherein the bonding of thermoplastic films on a metal band is noted with reference to JP 63203324A.

Finally, from the state of the art, other plastic materials, especially films of a wide variety, are known, which have a thermal adhesive construction and in this way are suitable for lamination, preferably on metal bands. For example, DE 101 30 005 A1 describes a method for coating the surface of a metal band with a plastic film, wherein a special plastic film with thermal-adhesive properties is laminated onto the metal band such that the metal band is heated to a certain temperature exceeding the melting temperature of the plastic film to be laminated, in order to be able to be connected to the metal band. The method described there is limited to special plastic materials and consequently is not usable universally.

BRIEF SUMMARY

The invention relates to a method for permanently joining an essentially flat support material to a substrate, in particular for laminating a plastic film to a metal substrate, wherein the at least essentially flat support material and/or the substrate is/are initially impinged upon by a connecting agent, preferably, an adhesive and subsequently the support material and the substrate are brought together in such a manner that the support material is permanently connected to the substrate, in particular, the plastic film is laminated on the metal substrate, and optionally, measuring and/or shaping of the thus formed composite material is carried out.

DETAILED DESCRIPTION

For the purposes of promoting an understanding of the disclosure, reference will now be made to the embodiments described herein. It will nevertheless be understood that no limitation of the scope of the disclosure is thereby intended, such alterations and further modifications in the described embodiments being contemplated as would normally occur to one skilled in the art to which the disclosure relates.

The present invention is thus based on the task of presenting a method, which is suitable for permanently joining at least essentially flat support materials with substrates, especially for laminating at least essentially flat support materials on substrates, especially metal substrates, and in this way, in particular, essentially avoiding or else at least lessening the disadvantages mentioned above.

Another task of the present invention is providing a method for coating or laminating substrates, especially metal substrates, especially plate-shaped metal substrates, such as sheet metal, metal plates, and the like, with, in particular, web-shaped flat support materials, preferably for the production of objects made from coated and/or printed metals, wherein such a method should be more economical in terms of investment, energy, and application and is also of higher quality and more powerful and more flexible in application to a greater degree in comparison to the methods of the state of the art, should operate as much as possible without emissions, and thus should be environmentally friendly, and thus should allow new innovative constructions for coatings with plastic films, but also for other materials, e.g., textiles, papers, leather, and the like, for the producers of objects, especially made from coated metals.

The subject matter of the present invention is thus, according to a first aspect of the present invention, a method for permanently joining an at least essentially flat support material with a substrate, especially a method for laminating a plastic film onto a metal substrate, wherein initially the one or more essentially flat support materials and/or substrates, preferably only the support materials, are loaded with a bonding agent (laminating agent), preferably an adhesive, and then the support material and the substrate are brought together or combined, such that the support material is connected permanently, particularly over the whole surface, to the substrate, specifically, the plastic film is laminated onto the metal substrate so that a more stable or permanent bond of the support material on one side and the substrate on the other side is produced.

The term bonding—occasionally also designated as lamination in the scope of the present invention—is understood within the scope of the present invention to be, in particular, the joining of two or more layers (i.e., in the scope of the present invention, specifically, the joining of support material with substrate) with the aid of a suitable bonding agent—synonymously also designated as laminating agent—wherein suitable adhesives are preferably used as the laminating agent as described below.

For performing the method according to the invention, in particular for continuous and/or automated operation, it is advantageous if the at least essentially flat support material has a web-like construction. In this way, it can then be combined and joined or laminated with the substrate to be loaded.

With the method according to the invention, nearly any support materials of the type named above can be applied or laminated onto suitable substrates. Examples for at least essentially flat support materials usable according to the invention, are plastic films, textiles, papers, leather, and the like. Preferably, according to the invention plastic films are used, especially printed or unprinted plastic films, e.g., stretched or unstretched plastic films, e.g., packaging films (e.g., polyolefin films, such as polyethylene or polypropylene films or polyester and poly(meth)acrylate films). Thus, for use with printed or decorative plastic films, the substrates, especially metal substrates, can be supplied in a simple way with a decorative pattern without requiring lamination.

In regard to the substrates used according to the invention, predominantly metal substrates are used, especially plate-shaped metal substrates, such as sheet metal, metal plates, and the like. The substrates are basically not limited in their dimensions. Advantageously, metal substrates, especially sheet metal or metal plates, are used in widths or thicknesses of 0.01 to 10 mm, especially 0.05 to 1.0 mm.

Examples for suitable metal substrates, especially sheet metal or metal plates, are, for example, metal substrates made from iron, steel, aluminum, tinplate, especially in a zinc-plated, tin-plated, or chromium-plated construction, or from alloys with corresponding thicknesses and dimensions.

Preferably, the method according to the invention is performed such that initially the at least essentially flat support material, especially the plastic film, is loaded with the bonding or laminating agent, preferably an adhesive, and then the support material loaded with the bonding or laminating agent, especially an adhesive, is combined with the substrate, so that the support material is permanently joined with the substrate over its complete surface. A stable joint or a stable lamination made from support material, especially a plastic film, is produced on one side and the substrate on the other side, in which the support material is stably and permanently joined with the substrate.

In general, the method according to the invention is performed such that the joining of support material and substrate is performed under pressure and/or clamping after the support material and/or substrate is loaded with the bonding or laminating agent (e.g., an adhesive). This is realized, for example, by means of rolls, cylinders, calenders, and the like, preferably with calenders.

Advantageously, the joining of the support materials and substrate is performed with heating, especially above the melting or softening range of the bonding or laminating agent, especially an adhesive. According to an especially preferred embodiment, here the support material, especially the plastic film, is first loaded with a suitable adhesive, especially a hot melt-type adhesive, and then combined with the substrate to be coated, especially a metal substrate. Here, the adhesive, especially a hot melt-type adhesive, is typically heated before and/or during the joining of the support material and substrate above its melting or softening temperature, so that a secure adhesive joint between the support material on one side and the substrate on the other side is guaranteed.

The loading or coating of the substrate with the support material can be realized on one or both sides. For example, both surface sides of a metal plate or sheet metal can be loaded with the support material, especially the plastic film, according to the method according to the invention or else only one of these two surface sides can be loaded with this material according to the desired use.

According to one especially preferred embodiment, the method according to the invention is performed continuously, especially in an automated way. For this purpose, the support material and the substrate to be loaded or joined with the support material is combined continuously after the application of the adhesive, typically by means of continuously moving transport devices, which continuously advance the support material on one side and the substrate on the other side and continuously combine and join or laminate.

The loading of the support material and/or the substrate, preferably only the support material, with the bonding or laminating agent, preferably an adhesive, is performed generally over the complete surface and/or homogeneously, especially with a uniform layer thickness. In this way, a more secure joint is guaranteed between the support material on one side and the substrate on the other side, especially also associated with good optical properties. In particular, the total surface area and homogeneous adhesive application guarantees an integrated or total surface area joint with a good structure over the entire surface area and bubble-free between the support material on one side and the substrate on the other side.

For guaranteeing a secure joint between the support material on one side and the substrate on the other side for simultaneously good processing properties, such as optical properties, etc., the bonding or laminating agent, especially the adhesive, is used or applied, particularly in an amount of 0.1 to 50 g/m², preferably 0.5 to 20 g/m². For this purpose, typically, according to the adhesive, layer thicknesses of the adhesive of 0.001 to 1 mm, preferably 0.001 to 0.5 mm, particularly preferred 0.005 to 0.05 mm, are applied. As described above, the application of the bonding or laminating agent, especially the adhesive, is typically performed with heating, typically with fusion, preferably at temperatures in the range of 90 to 200° C., especially 100 to 170° C.

The application of the adhesive can be realized in an arbitrary way, for example, by means of nozzles, spraying devices, doctor blades, cylinders, and the like. Preferably, the adhesive application is performed by means of nozzle application, for example, by slotted nozzles. In this way, both a contact method, in which the nozzle lip is in contact with the material to be loaded, or else a so-called non-contact method, in which the nozzle lip is generally at a distance of approximately 1 to 5 mm from the material to be loaded with adhesive, can be used.

As a bonding or laminating agent, typically a solvent-free adhesive, especially a hot melt-type adhesive, is used. Here, it involves, in particular, water and solvent-free adhesives that are solid at room temperature and are applied onto the materials to be adhered from the melt and that set physically and/or chemically after the combining while cooling with hardening.

As suitable hot melt-type adhesives according to the invention, according to requirements, in particular, hot melt-type adhesives with thermoplastic or reactive quality can be used.

The hot melt-type adhesives that are used are selected especially as a function of the materials to be bonded and the related requirements, for example, a necessary temperature or heat resistance of the bond, etc.

As thermoplastic hot melt-type adhesives, in particular, those on the basis of ethylene/vinyl acetates (EVA), polyolefins (e.g., amorphous poly-α-olefins or polyolefins produced in a metallocene catalytic method), polyacrylates, copolyamides, copolyesters, and/or thermoplastic polyurethanes or corresponding copolymers and/or terpolymers can be used.

As reactive, for example, moisture crosslinking hot melt-type adhesives, especially those on the basis of silane-grafted amorphous poly-α-olefins, silane-grafted polyolefins produced in a metallocene catalytic method (cf. EP 1 508 579 A1), or isocyanate-terminated polyurethanes can be used. For the reactive hot melt-type adhesives, the subsequent crosslinking with moisture leads to temperature or heat-resistant bonding. Reactive hot melt-type adhesives thus combine the advantages of quick starting strength due to the physical hardening process of the cooling with chemical crosslinking taking place subsequently. For the processing of moisture-reactive hot melt-type adhesives, the melt must be protected from moisture before its application.

For example, for the lamination of metal plates or sheet metal with OPP films (=Oriented polypropylene films) in reverse side-printed or unprinted form in combination with a high temperature resistance of the composite, hot melt-type adhesives based on silane-grafted polyolefins are used.

Polymers for reactive moisture crosslinking hot melt-type adhesives suitable in the scope of the present invention are, for example, the silane-modified poly-α-olefins available commercially under the product designation "Vestoplast® 206" from Degussa AG in Marl, Germany. According to the invention, especially preferred are silane-modified poly-α-olefins with average molecular weights $M_n$ of 5000 to 25,000 g/mol, preferably 10,000 to 20,000 g/mol.

Other reactive hot melt-type adhesives suitable according to the invention include, for example, radiation crosslinking reactive hot melt-type adhesives (e.g., reactive hot melt-type adhesives crosslinking under UV irradiation). Suitable radiation crosslinking hot melt-type adhesives are, e.g., UV-crosslinkable hot melt-type adhesives, especially on the basis of (meth)acrylate polymers and copolymers or acrylates polyesters and/or polyurethanes, preferably UV-crosslinkable hot melt-type adhesives on the basis of acrylate copolymers, like those sold, for example, under the designation "acResin®," e.g., "acResin® A203 UV," by BASF AG in Ludwigshafen. In the case of UV crosslinking hot melt-type adhesives, a photo-initiator is generally added to the adhesive mixture that is used; this can be added to the adhesive mixture either as a separate photo-initiator or it can be a component of the UV crosslinkable hot melt-type adhesive itself, in particular, it can be included in the UV-reactive polymer (e.g., UV-reactive acrylate copolymer with photoreactive groups) (e.g., in the form of chemically installed photoreactive groups, which are bound to the UV-reactive polymer, as is the case, e.g., in the previously mentioned product "acResin® A203 UV" from BASF AG in Ludwigshafen). By means of the irradiation or crosslinking periods, intensities, energies, wavelengths, etc., the properties of the adhesive bond can be controlled in a targeted way (e.g., shearing strength, etc.). As described in more detail below, for controlling the open time and/or the adhesive properties of the radiation crosslinking, especially UV crosslinking, reactive hot melt-type adhesives, additives can be added on the basis of non-reactive polymers, resins, and/or waxes, e.g., possibly hydrated colophonium resin esters and aliphatic hydrocarbon resins. An especially suitable example receptor according to the invention for a UV crosslinking reactive hot melt-type adhesive system comprises, e.g., 90 wt % UV reactive acrylic acid ester copolymer (e.g., acResin® A203 UV from BASF AG) and 10 wt % aliphatic hydrocarbon resins (e.g., Escorez® 1310, Exxon Mobil).

The application of the adhesive onto the support material and/or the substrate can be performed in wide temperature ranges, preferably exclusively on the support material. As previously described, in general, processing temperatures are selected in the range of 90° C. to 200° C., preferably 100° C. to 170° C.

To achieve a good application of the hot melt-type adhesive, typically those hot melt-type adhesives are used that exhibit Brookfield viscosity values in the range of, in general, 50 to 1,000,000 mPa·s for processing temperatures, in general 90° C. to 200° C.

For example, in a preferred way according to the invention, reactive hot melt-type adhesives on the basis of silane-grafted polyolefins, especially silane-grafted poly-α-olefins, can be used that exhibit Brookfield viscosity values in the range of 50 to 50,000 mPa·s, particularly 1000 to 10,000 mPa·s, preferably 5000 to 8000 mPa·s, particularly preferred 5500 to 7500 mPa·s, at 180° C.

For controlling the reactivity and the crosslinking behavior, typical catalysts, which are commonly used for this purpose, can be added to the reactive hot melt-type adhesives, e.g., dibutyltin dilaurate (DBTL), and this in quantities typical for these purposes. Examples for suitable catalysts according to the invention are catalysts that are common and known in adhesive chemistry, like the previously named dibutyltin dilaurate (DBTL) or else alkyl mercaptide compounds of dibutyltin, or else organic iron, lead, cobalt, bismuth, antimony, and zinc compounds, as well as mixtures of the compounds named above or catalysts based on amine, such as tertiary amines, 1,4-diazabicyclo[2.2.2]octane and dimorpholinodiethyl ether, as well as their mixtures. Particularly preferred according to the invention is dibutyltin dilaurate (DBTL), particularly in combination with adhesives based on the previously mentioned reactive, preferably silane-modified poly-α-olefins. The quantities of catalyst(s) that are used can vary in wide ranges; in particular, the quantity of catalyst that is used equals 0.01 to 5 wt % relative to the adhesive.

For controlling the application properties of the adhesives, additional additives can also be added to these adhesives, for example, softeners, high boiling-point organic oils or esters or other additives, stabilizers, antioxidants, acid scavengers, fillers, anti-aging agents, and the like used for plastifying.

For controlling the open time and/or the adhesive properties of the adhesives named above, especially also with respect to improved handing, other additives based on non-reactive polymers, resins, and/or waxes can also be added to the previously mentioned hot melt-type adhesives. In this way, the adhesive properties can be set and tailored, so-to-speak, relative to the application.

The quantities of non-reactive polymers, resins, and/or waxes can vary over wide ranges. In general, they lie in the range of 1 wt % to 70 wt %, particularly 5 wt % to 65 wt %, preferably 10 wt % to 60 wt %, relative to the adhesive. Nevertheless, depending on the application or individual case, it can be necessary to deviate from the quantities named above.

In regard to the non-reactive polymers, these can be selected, for example, from the group of (i) ethylene/vinyl acetate copolymers or terpolymers, especially those with vinyl acetate contents between 12 and 40 wt %, especially 18 to 28 wt %, and/or with melt-flow index values (MFIs, DIN 53735) from 8 to 800, especially 150 to 500; (ii) polyolefins, such as unmodified amorphous poly-α-olefins, especially with average molecular weights $M_n$ of 5000 to 25,000 g/mol, preferably 10,000 to 20,000 g/mol, and/or with ring and ball softening ranges between 80 and 170° C., preferably between 80 and 130° C., or unmodified polyolefins produced in a metallocene catalytic method (cf. DE 103 23 617 A1); and (iii) (meth)acrylates, such as styrene(meth)acrylates, as well as mixtures of these compounds.

In regard to the non-reactive resins, these can be selected, in particular, from the group of hydrocarbon resins, especially aliphatic, cyclic, or cycloaliphatic hydrocarbon resins, optionally modified colophonium resins (e.g., colophonium resin esters), terpene phenol resins, coumarone indene resins, α-methyl styrene resins, polymerized tall resin esters, and/or ketone aldehyde resins.

In regard to the non-reactive waxes, for example, polyolefin waxes, such as polyethylene and polypropylene waxes, or waxes modified on this basis can be used.

As previously explained, the method according to the invention is suitable especially for laminating plastic films on metal substrates by means of a hot melt-type adhesive as a laminating agent.

After applying the at least essentially flat support material, especially the plastic film, onto the substrate, preferably a metal substrate, general packing (dimensioning or changing the size) and/or shaping of the composite material so generated is then performed.

In regard to the packing, in the scope of this processing step, the dimensioning or changing the size of the previously generated composite material made from support material and substrate is performed, for example, by cutting and the like.

In the scope of shaping, the shape of the previously generated composite material made from support material and substrate is then formed into the desired form. The shaping can be performed by means of shaping methods that are typical in metal processing, for example, by means of drawing processes, such as deep-drawing, draw-forming and stretch-forming, non-cutting shaping, bending, embossing, stamping, rolling, and the like.

A basic characteristic of the method according to the invention must be seen in that dimensioning (packing) and shaping are performed only after generating the composite materials made from support material and substrate, especially plastic film-laminated metal substrates. This leads to an enormous increase in quality and performance, as well as flexibility in application, because first a composite material is generated that can be used universally and that is fed first into a subsequent processing step for dimensioning or packing and/or shaping for its end application.

For example, metal objects coated with decorative plastic films according to the method according to the invention, for example, metal packages, metal cans, screw plugs for jars and bottles, crown caps, technical cans, food and aerosol cans, decorations, and the like can be produced.

The method according to the invention is economical in terms of investment, energy, and application, can be realized in a space-saving form, features high quality and strong performance, and is flexible in application to an equally high degree.

Because of the elimination of the requirement for lamination and the like, the method according to the invention operates to a large degree without emissions and is thus environmentally friendly. Therefore, new innovative shaping possibilities for coatings, e.g., with plastic films, textiles, papers, leather, etc., open up for producers of objects made from coated metal substrates.

In comparison with complicated coating or other laminating methods of the state of the art, the method according to the invention allows production to be realized with a single processing step instead of several separate processing steps.

With the method according to the invention, metal packages and containers suitable for food can also be produced by means of corresponding adhesive and film application.

The method according to the invention allows—based on the simple use of many coating materials, e.g., plastic films, textiles, papers, leather, etc.—a plurality of possible innovations for the related end products.

In addition, through the method according to the invention, the costs for the production of the metal substrates can be reduced considerably, because complicated corrosion protection by means of zinc-plating, tin-plating, chromium-plating, and the like is eliminated, and because the metal substrates loaded by means of adhesive and plastic film are already protected sufficiently from corrosion.

The method according to the invention is thus associated with a plurality of advantages.

Another subject matter of the present invention includes, according to a second aspect of the present invention, the products available from the method according to the invention, i.e., composite materials that feature an at least essentially flat support material, especially a plastic film, wherein the at least essentially flat support material is laminated by means of a suitable bonding or laminating agent, especially an adhesive, onto a substrate, especially a metal substrate, such that the support material is joined permanently and over the entire surface with the substrate, specifically, the plastic film is laminated onto the metal substrate.

The products or composite materials according to the invention can then be subjected to dimensioning and/or shaping, as previously described. The subject matter of the present invention thus also includes shaped (i.e., three-dimensionally shaped), especially dimensioned (i.e., for example, cut, stamped, etc.) and three-dimensionally shaped products or composite materials of the type named above.

For further details with regard to the products or composite materials according to the invention, refer to the above statements on the method according to the invention, which apply accordingly with regard to the products or composite materials according to the invention.

Another subject matter of the present invention, according to a third aspect of the present invention, is the use of the products or composite materials according to the invention, in particular, for producing shaped objects or molded bodies of any type (i.e., three-dimensionally shaped objects or bodies with non-level regions, especially raised sections, recesses, doming, bulges, bent sections, or the like), like, in particular, packages, containers, closures of all types (e.g., screw plugs for jars, bottles, and the like, covers, etc.), crown caps, cans (e.g., technical cans, food and aerosol cans, and the like), decorations, etc., like those that can be obtained after corresponding dimensioning and/or shaping starting from the products or composite materials according to the invention.

Finally, another subject matter, according to another aspect of the present invention, includes the previously described end materials or end products as such, i.e., the formed objects (molded bodies) of any type obtained by means of dimensioning and shaping starting from the products or composite materials according to the invention, in particular, packages, containers, closures, and covers of all types (e.g., screw caps for jars, bottles, and the like), crown caps, cans (e.g., technical cans, food and aerosol cans, and the like), decorations, etc.

Other constructions, modifications, variations, and advantages of the present invention can be easily identified and realized by someone skilled in the art when reading the description, without leaving the scope of the present invention.

The present invention is further illustrated with reference to the following embodiment, which, however, does not limit the present invention in any way.

A web-shaped decorative plastic film based on an oriented polypropylene film printed on one side is loaded on its side provided with the printing by means of a slotted nozzle over the entire area and with uniform layer thickness in a quantity of ca. 5 g/m$^2$ with a hot melt-type adhesive. For the purpose of application, the hot melt-type adhesive is brought to a temperature of ca. 150° C. and applied to the plastic film with this temperature. As a hot melt-type adhesive, a mixture is used made from 49.9 wt % Vestoplast® 206 (Degussa AG, hot melt-type adhesive based on silane-functionalized non-modified poly-α-olefins), 40.0 wt % Vestoplast® 703 (Degussa AG, non-modified amorphous poly-α-polymers), 10.0 wt % Escorez® 5320 (Exxon Mobil, hydrocarbon resin), and 0.1 wt % catalyst (dibutyltin dilaurate).

The web-shaped plastic film loaded in this way with adhesive is then combined with a web-shaped metal plate. The joining is performed under pressure or clamping by means of a calender that can be heated, so that the plastic film is laminated by means of the hot melt-type adhesive on the metal plate and an intimate bond is generated of the plastic film on one side and the metal substrate on the other side. The metal substrate laminated with the plastic film is then cooled and cut or dimensioned for the relevant application. Through deep-drawing, closures or covers for metal packages are obtained that are laminated with a decorative plastic film.

Compared with conventional laminating methods, the method according to the invention is significantly simplified. In addition, solvent emissions are prevented. In addition, the printing of the film is protected in an efficient way through the inner-side arrangement.

While the preferred embodiment of the invention has been illustrated and described in the foregoing description, the same is to be considered as illustrative and not restrictive in character, it being understood that all changes and modifications that come within the spirit of the invention are desired to be protected.

The invention claimed is:

1. A method for producing molded objects provided with a printed decorative pattern,
   (i) wherein, in a first step, a printed or decorative plastic film comprising a printing or decorative pattern is permanently joined to a plate-shaped metal substrate, wherein initially the plastic film and/or the metal substrate is or are loaded with a bonding agent in the form of a radiation cross-linking reactive adhesive and wherein then the plastic film and the metal substrate are brought together, such that the plastic film is joined permanently with the metal substrate and in this way is laminated onto the metal substrate, thus resulting in a composite material, and
   (ii) wherein subsequently the composite material made from the printed or decorative plastic film and metal substrate is shaped into a three-dimensionally shaped molded object by a shaping process which is selected from the group consisting of deep-drawing, draw-forming, stretch-forming, non-cutting forming, bending, embossing and stamping, wherein the printing or decorative pattern comprised by the plastic film is protected during the shaping process.

2. The method of claim 1 wherein loading the plastic film and/or the metal substrate with the bonding agent includes a step of applying the bonding agent over the metal substrate so that the plastic film is joined over the entire area of the substrate.

3. The method of claim 1 which further includes a step of applying a clamping force while applying heat.

4. The method of claim 1 wherein the initial step of loading the plastic film and/or the metal substrate with the bonding agent includes a step of applying the bonding agent on two sides of the metal substrate.

5. The method of claim 1, wherein the method is performed continuously and in an automated way, wherein the plastic film and the metal substrate to be joined with the plastic film are brought together and joined with each other continuously after applying the adhesive by means of continuously moving transport devices.

6. The method of claim 1, wherein the initial step of loading of the plastic film and/or the metal substrate is performed with the bonding agent over the entire area and homogeneously with a uniform layer thickness of the bonding agent.

7. The method of claim 1, wherein the bonding agent is applied in a quantity of 0.1 to 50 g/m$^2$ and with a layer thickness of 0.001 to 1 mm.

8. The method of claim 1, wherein the initial step of applying the bonding agent is performed by means of apparatuses selected from the group consisting of nozzles, spraying devices, doctor blades, and cylinders.

9. The method of claim 1, wherein the bonding agent is a solvent-free hot-melt adhesive.

10. The method of claim 9, wherein the hot-melt adhesive has a Brookfield viscosity value in the range of 50 to 1,000,000 mPa·s at processing temperatures in the range of 90° C. to 200° C.

11. The method of claim 9, characterized in that the hot-melt adhesive is based on a silane-grafted polyolefin.

12. The method of claim 9, wherein the hot-melt adhesive contains at least one catalyst selected from the group consisting of organic tin compounds, alkyl mercaptide compounds of the dibutyltin, organic iron, lead, cobalt, bismuth, antimony, and tin compounds.

13. The method of claim 9, wherein the hot-melt adhesive contains at least one additive selected from the group consisting of softeners, high boiling-point organic oils, esters, stabilizers, antioxidants, acid scavengers, fillers, and anti-aging agents used for plastifying.

14. The method of claim 1, wherein a non-reactive resin is added to the adhesive, said non-reactive resin being selected from the group consisting of hydrocarbon resins, aliphatic, cyclic, or cycloaliphatic hydrocarbon resins, colophonium resins, terpene phenol resins, coumarone-indene resins, a-methyl styrene resins, polymerized tall resin esters, and ketone aldehyde resins.

15. The method of claim 1, wherein a non-reactive wax is added to the adhesive, said non-reactive wax being selected from the group consisting of polyolefin waxes, polyethylene and polypropylene waxes, and waxes modified on this basis.

16. A method for producing molded objects provided with a printed decorative pattern,
(i) wherein, in a first step, a printed or decorative plastic film comprising a printing or decorative pattern is permanently joined to a plate-shaped metal substrate, wherein initially the plastic film and/or the metal substrate is or are loaded with a bonding agent in the form of a radiation cross-linking reactive adhesive and wherein then the plastic film and the metal substrate are brought together, such that the plastic film is joined permanently with the metal substrate and in this way is laminated onto the metal substrate, thus resulting in a composite material, and
(ii) wherein subsequently the composite material made from the printed or decorative plastic film and metal substrate is shaped into a three-dimensionally shaped molded object by a shaping process which is selected from the group consisting of deep-drawing, draw-forming, stretch-forming, non-cutting forming, bending, embossing and stamping.

* * * * *